United States Patent
Uyehara

(10) Patent No.: US 7,630,491 B1
(45) Date of Patent: Dec. 8, 2009

(54) SPEAKER ENHANCER AND METHOD OF USE

(75) Inventor: Chad Tyler Uyehara, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 557 days.

(21) Appl. No.: 11/344,688

(22) Filed: Jan. 31, 2006

(51) Int. Cl.
*H04M 9/00* (2006.01)
*H04M 1/00* (2006.01)
*H04R 25/00* (2006.01)

(52) U.S. Cl. .................... 379/433.02; 379/433.01; 381/345; 381/347

(58) Field of Classification Search ............ 379/433.02, 379/433.04, 430; 455/550.1, 556.2, 90.3, 455/575.1; 381/337–338, 345, 347–350, 381/182, 371–373; 361/679.01, 679.02, 361/679.55, 679.53
See application file for complete search history.

(56) References Cited

U.S. PATENT DOCUMENTS

| | | | | |
|---|---|---|---|---|
| 5,655,017 | A | * 8/1997 | Fishman | 379/420.02 |
| 5,909,490 | A | * 6/1999 | Sokolich et al. | 379/433.02 |
| 6,434,407 | B1 | * 8/2002 | Cook | 455/569.1 |
| 6,490,361 | B1 | * 12/2002 | Klein | 381/353 |
| 6,758,303 | B2 | * 7/2004 | Zurek et al. | 181/155 |
| 6,825,810 | B2 | 11/2004 | Ragner et al. | |
| 7,027,797 | B2 | * 4/2006 | Mori | 455/350 |
| 2001/0027089 | A1 | 10/2001 | Salam | |
| 2003/0096632 | A1 | * 5/2003 | Kim et al. | 455/550 |
| 2007/0154053 | A1 | * 7/2007 | Yang | 381/386 |

* cited by examiner

Primary Examiner—Curtis Kuntz
Assistant Examiner—Phylesha Dabney

(57) ABSTRACT

A speaker enhancer for a wireless communication device includes an acoustic chamber forming section that, when the speaker enhancer is mounted to a rear of the wireless communication device, forms a sealed acoustic enclosure along the rear of the wireless communication device; and a speaker engagement section that, when the speaker enhancer is mounted to the rear of the wireless communication device, sealingly engages the rear of the wireless communication device and communicates the rearward-facing, rear-mounted speaker with the sealed acoustic enclosure. In use, rearwardly directed sound emitted from a rearward-facing, rear-mounted speaker travels through the speaker engagement section to the sealed acoustic enclosure, and primary sound from the speaker is emitted through sound leaks in the wireless communication device.

15 Claims, 2 Drawing Sheets

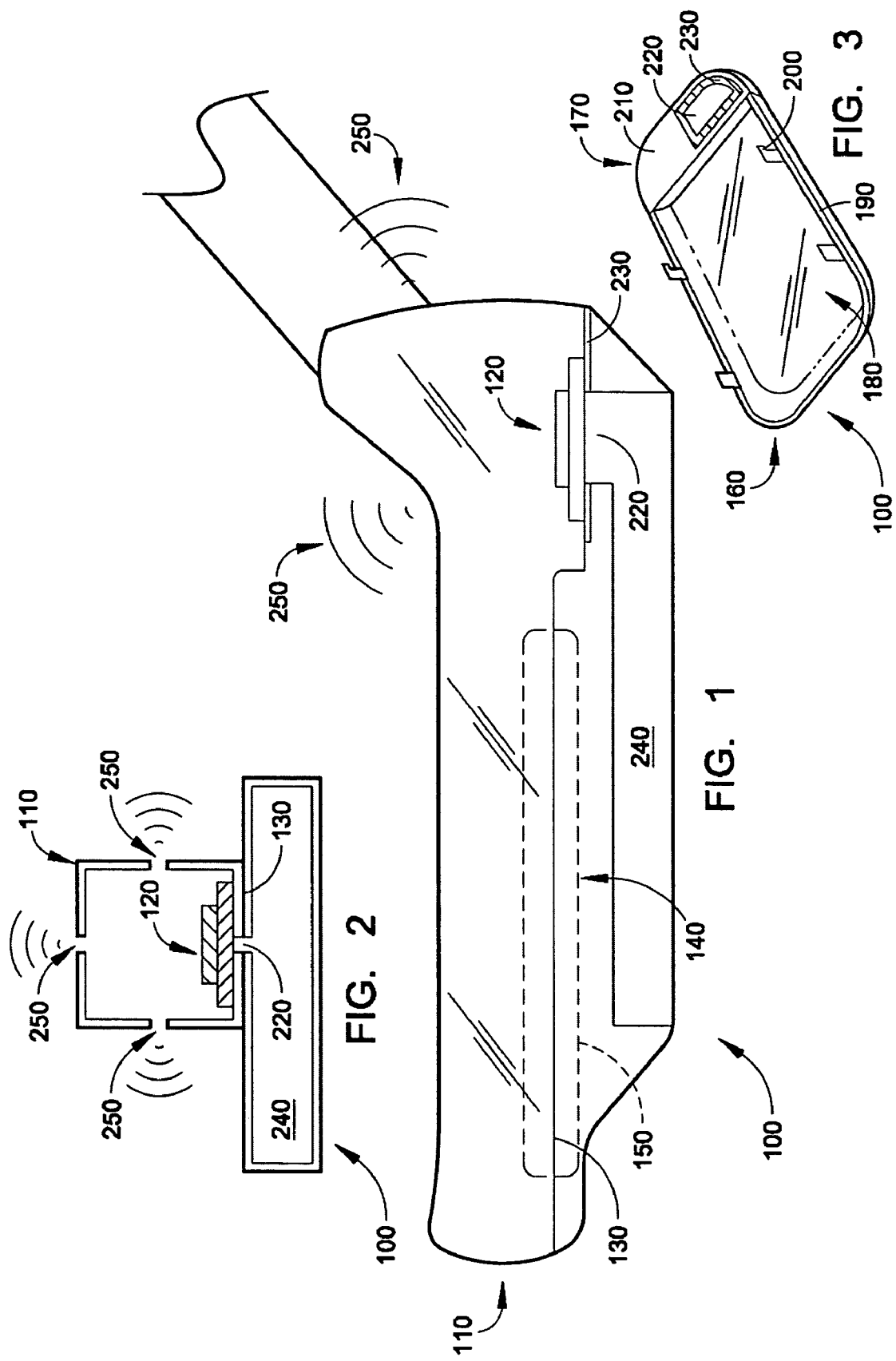

SPEAKER ENHANCER AND METHOD OF USE

FIELD OF THE INVENTION

The present invention generally relates to portable wireless communication devices and, more particularly, relates to hands free, speakerphone, or push-to-talk applications of wireless communication devices.

BACKGROUND OF THE INVENTION

Many wireless communication devices include a loudspeaker system for broadcasting sound from the wireless communication device. As a result, the user can hear sound broadcasted without having to hold the earpiece of the wireless communication device up to one's ear. This mode of operation is commonly known as hands-free, speakerphone, loudspeaker, or push-to-talk. Problems with speakerphone systems of portable wireless communication devices include the lack of sound quality and volume levels are not loud enough to be deemed usable by the listener.

SUMMARY OF THE INVENTION

Accordingly, an aspect of the present invention involves a speaker enhancer for loudspeakers of wireless communication devices. In the embodiment shown and described herein, the speaker enhancer is a separate device that is attached to the rear of the wireless communication device, over a rearward-facing, rear-mounted speaker. The speaker enhancer may be a replacement for the regular battery door that would normally attach to the rear of the wireless communication device. The speaker enhancer may include a port that communicates the rearward-facing, rear-mounted speaker with an acoustic chamber of the speaker enhancer. Where the port of the speaker enhancer communicates with the rear-mounted speaker, a seal may be provided to prevent sound leaks in this area. The simple addition of the acoustic chamber improves the sound quality and increases the audio output level or sound power from the wireless communication device. Adding the speaker enhancer attachment also allows wireless communication devices with restricted sound qualities to be used for higher quality sound applications.

Another aspect of the invention involves a speaker enhancer for a wireless communication device. The speaker enhancer includes an acoustic chamber forming section that, when the speaker enhancer is mounted to a rear of the wireless communication device, forms a sealed acoustic enclosure along the rear of the wireless communication device; and a speaker engagement section that, when the speaker enhancer is mounted to the rear of the wireless communication device, sealingly engages the rear of the wireless communication device and communicates a rearward-facing, rear-mounted speaker with the sealed acoustic enclosure. In use, rearwardly directed sound emitted from the rearward-facing, rear-mounted speaker travels through the speaker engagement section to the sealed acoustic enclosure and primary sound from the speaker is emitted through sound leaks in the wireless communication device.

An additional aspect of the invention involves a speaker enhancer for a wireless communication device. The speaker enhancer includes an acoustic chamber forming section that, when the speaker enhancer is mounted to the wireless communication device, forms a sealed acoustic enclosure for the speaker. In use, front wave sound that was once emitted from the speaker ports of the wireless communication device is now contained in the sealed acoustic enclosure. The improved sound now uses the primary sound energy of the loudspeaker, which is emitted from the speaker in a direction opposite to the front wave sound, to disperse sound through leaks in the wireless communication device.

A further aspect of the invention involves a method of using a speaker enhancer with a wireless communication device. The method includes receiving the speaker enhancer on a rear of the wireless communication device, the speaker enhancer including an acoustic chamber forming section that, when the speaker enhancer is mounted to the rear of the wireless communication device, forms a sealed acoustic enclosure along the rear of the wireless communication device, and a speaker engagement section that, when the speaker enhancer is mounted to the rear of the wireless communication device, sealingly engages the rear of the wireless communication device and communicates a rearward-facing, rear-mounted speaker with the sealed acoustic enclosure; and emitting sound rearwardly from the rearward-facing, rear-mounted speaker through the speaker engagement section to the sealed acoustic enclosure and emitting primary sound from the speaker through sound leaks in the wireless communication device

BRIEF DESCRIPTION OF THE DRAWINGS

The details of the present invention, both as to its structure and operation, may be gleaned in part by the accompanying drawings, in which like reference numerals refer to like parts, and in which:

FIG. 1 is a right-side, cross-sectional view of an embodiment of a speaker enhancer attached to the rear of a clamshell-style wireless communication device;

FIG. 2 is a simplified right-side, cross-sectional view of the speaker enhancer and wireless communication device of FIG. 1;

FIG. 3 is a perspective view of the speaker enhancer of FIG. 1.

DETAILED DESCRIPTION

Figure 4:
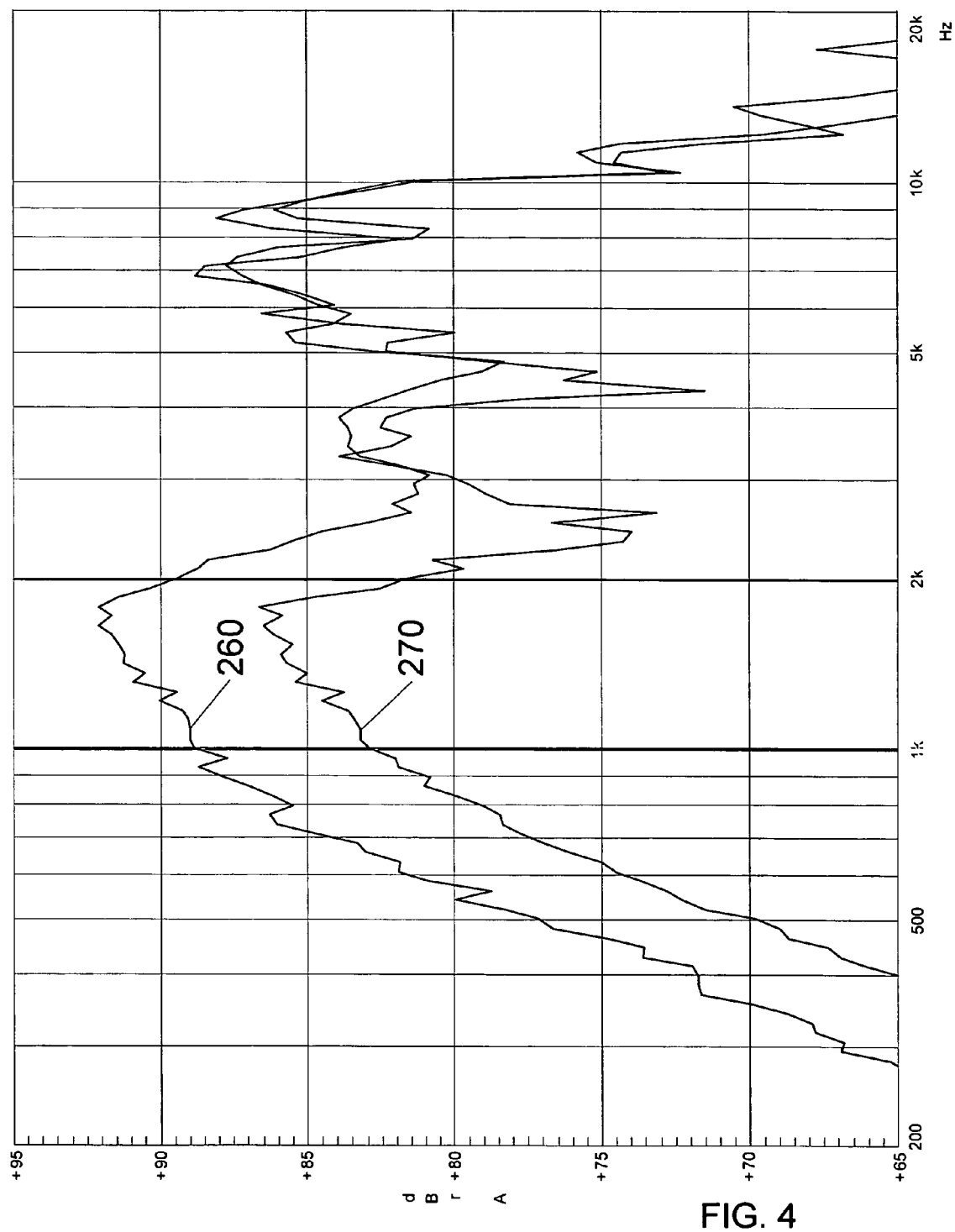
FIG. 4 is a graph showing sound characteristics of a wireless communication device with and without the speaker enhancer.

With reference to FIGS. 1-3, an embodiment of a speaker enhancer 100 for a wireless communication device 110 having a rearward-facing, rear-mounted loudspeaker 120 will be described.

Although the wireless communication device 110 is shown as a clamshell-style mobile phone, the speaker enhancer 100 may be used with other types of wireless communication devices. For example, but not by way of limitation, the speaker enhancer 100 may be used with or incorporated in a wireless communication device including a low-tier speakerphone, a wireless communication device including a mid-tier speakerphone, and a push-to-talk (PTT) or two-way wireless communication device (requires loud and clear audio performance to overcome the typical high background noise level environments). In further embodiments, the speaker enhancer 100 may be used with devices that include one or more speakers, other than wireless communication devices. Still further, the speaker enhancer 100 may be used with devices including one or more loudspeakers where the one or more loudspeakers are other than rearward-facing, rear-mounted. Also, the speaker enhancer 100 may be mounted or integrated in a location other than the rear of the device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

In the embodiment shown, the speaker enhancer 100 is a separate plastic device that is removably attachable to a rear 130 of the wireless communication device 110. The speaker enhancer 100 may be a replacement for the regular battery door that would normally attach to the rear 130 of the wireless communication device, over battery compartment 140 and battery 150. The speaker enhancer 100 includes a lower acoustic chamber forming section 160 and an upper speaker engagement section 170. The lower acoustic chamber forming section 160 includes a chamber 240, an edge 190, and protruding catches 200 extending from the edge 190. The volume of the enclosure 240, depends on the size and requirements of the loudspeaker, but may range from 4-8 cubic centimeters for the embodiment shown. The speaker engagement section 170 includes an engagement face 210, a port 220, and a seal 230 surrounding the port 220 on the engagement face 210.

When the speaker enhancer 100 is attached to the rear 130 of the wireless communication device 110, a sealed acoustic enclosure 240 is formed and captured for the front wave of the loudspeaker 120 that ports through port 220 of the wireless communication device 110. The port 220 communicates sound holes for the rearward-facing, rear-mounted speaker 120 with the acoustic enclosure 240. The seal 230 around the port 220 prevents sound leaks in this area. The speaker enhancer 100 causes the primary (magnet side, upper side) sound energy from the speaker 120 to be emitted through undesired or deliberate leaks or sound porting 250 of the wireless communication device 110. The deliberate leaks 250 may include, but not by way of limitation, removable plugs, different plastics, different circuit boards, different keyboards, and different keypads.

FIG. 2 is a simplified right-side, cross-sectional view of the speaker enhancer 100 and wireless communication device 110 of FIG. 1. FIG. 2 illustrates primary sound energy from the loudspeaker 120 being emitted from the leaks or sound porting 250 of the wireless communication device 110 when, in the opposite direction, rearwardly directed sound energy is emitted from the rearward-facing, rear-mounted loudspeaker 120 into the sealed acoustic enclosure 240 of the speaker enhancer 100.

The speaker enhancer 100 will now be described in use. The rear 130 of the wireless communication device 110 receives the speaker enhancer 100. Holes in the rear 130 of the wireless communication device 110 receive the corresponding protruding catches 200. The speaker enhancer 100 is then snapped or locked into position relative to the rear 130 of the wireless communication device 110 in a manner similar to that of attaching a battery compartment door to the rear 130 of the wireless communication device 110.

When the speaker enhancer 100 is attached to the rear 130 of the wireless communication device 110, as shown in FIG. 1, the sealed acoustic chamber 240 is formed along the rear 130 of the wireless communication device 110. The upper speaker engagement section 170 covers, mates, and seals the sound holes for the rearward-facing, rear-mounted speaker 120. The port 220 communicates the sound holes for the rearward-facing, rear-mounted speaker 120 with the acoustic chamber 240. Rearwardly directed sound is emitted from the rearward-facing, rear-mounted loudspeaker 120. The sound travels through the port 220 to the acoustic chamber 240. Primary sound from the rear-mounted loudspeaker 120 is now emitted in the opposite direction, through the leaks or sound porting 250 of the wireless communication device 110.

In alternative embodiments of the speaker enhancer 100, the speaker enhancer 100 may be, but not by way of limitation, part of a battery door, an add-on accessory, and a belt clip add-on accessory. Although the speaker enhancer 100 is described as being a separate device that is added to the rear 130 of the wireless communication device 100, in an alternative embodiment, the wireless communication device 100 may be manufactured with the speaker enhancer 100 as part of the wireless communication device 100.

The addition of the speaker enhancer 100 to the rear 130 of the wireless communication device 110 improves the sound quality and increases the audio output level or sound power compared to a similar wireless communication device 110 without the speaker enhancer 100. FIG. 4 is a graph showing sound characteristics of a wireless communication device with and without the speaker enhancer 100. The top curve 260 in FIG. 4 represents sound for a wireless communication device 110 with the speaker enhancer 100. The bottom curve 270 represents sound for a wireless communication device 110 without the speaker enhancer 100. The two curves 260, 270 show a considerable gain of approximately 6 dB (equivalent to roughly 2 volume steps with many common wireless communication devices) in the frequency region most important to speech (approximately 300 Hz to 4 kHz).

The simple addition of the speaker enhancer 100 improves the sound quality and increases the volume of the emitted sound from the wireless communication device 110. Adding the speaker enhancer 100 also allows wireless communication devices with limited sound quality and volume to be used for higher sound quality and volume applications.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A speaker enhancer for a wireless communication device, the wireless communication device including a rear, a rearward-facing, rear-mounted speaker mounted therein, and sound leaks located behind the rearward-facing, rear-mounted speaker in the wireless communication device, comprising:

an acoustic chamber forming section that, when the speaker enhancer is mounted to the rear of the wireless communication device, forms a sealed acoustic enclosure along the rear of the wireless communication device; and a speaker engagement section that, when the speaker enhancer is mounted to the rear of the wireless communication device, sealingly engages the rear of the wireless communication device and communicates the rearward-facing, rear-mounted speaker with the sealed acoustic enclosure, wherein, in use, rearwardly directed sound emitted from the rearward-facing, rear-mounted speaker travels through the speaker engagement section to the sealed acoustic enclosure and primary sound from the speaker is emitted through sound leaks located behind the rearward-facing, rear-mounted speaker in the wireless communication device.

2. The speaker enhancer of claim 1, wherein the wireless communication device includes a battery compartment in the rear of the wireless communication device, and the speaker enhancer is removably attachable to the rear of the wireless communication device, at least partially over the battery compartment.

3. The speaker enhancer of claim 1, wherein the wireless communication device includes one or more holes on the rear and the speaker enhancer includes one or more corresponding protruding catches that mate with the one or more holes for removably attaching the speaker enhancer to the wireless communication device.

4. The speaker enhancer of claim 1, wherein the sealed acoustic enclosure has a volume of 4-8 cubic centimeters.

5. The speaker enhancer of claim 1, wherein the speaker engagement section includes an engagement face, a port communicating with the sealed acoustic enclosure, and a seal surrounding the port on the engagement face.

6. The speaker enhancer of claim 5, wherein the rear of the wireless communication device includes sound holes for the rearward-facing, rear-mounted speaker, and the seal of the speaker engagement section sealingly engages the rear of the wireless communication device around the sound holes.

7. A speaker enhancer for a wireless communication device, the wireless communication device including a speaker mounted therein, and sound leaks located behind the speaker in the wireless communication device, comprising:
   an acoustic chamber forming section that, when the speaker enhancer is mounted to the wireless communication device, forms a sealed acoustic enclosure for the speaker;
   a speaker engagement section that, when the speaker enhancer is mounted to the wireless communication device, sealingly engages the wireless communication device and communicates the speaker with the sealed acoustic enclosure, and the speaker engagement section includes an engagement face, a port communicating with the sealed acoustic enclosure, and a seal surrounding the port on the engagement face; and
   wherein, in use, a front wave of sound energy emitted from the speaker travels to the sealed acoustic enclosure and primary sound from the speaker is emitted through sound leaks located behind the speaker in the wireless communication device.

8. The speaker enhancer of claim 7, wherein the wireless communication device includes sound holes for the speaker, and the seal of the speaker engagement section sealingly engages the wireless communication device around the sound holes.

9. A method of using a speaker enhancer with a wireless communication device, the wireless communication device including a rear, a rearward-facing, rear-mounted speaker mounted therein, and sound leaks located behind the rearward-facing, rear-mounted speaker in the wireless communication device, comprising:
   receiving the speaker enhancer on the rear of the wireless communication device, the speaker enhancer including an acoustic chamber forming section that, when the speaker enhancer is mounted to the rear of the wireless communication device, forms a sealed acoustic enclosure along the rear of the wireless communication device, and a speaker engagement section that, when the speaker enhancer is mounted to the rear of the wireless communication device, sealingly engages the rear of the wireless communication device and communicates the rearward-facing, rear-mounted speaker with the sealed acoustic enclosure; and
   emitting sound rearwardly from the rearward-facing, rear-mounted speaker through the speaker engagement section to the sealed acoustic enclosure and emitting primary sound from the speaker through sound leaks located behind the rearward-facing, rear-mounted speaker in the wireless communication device.

10. The method of claim 9, wherein the wireless communication device includes a battery compartment in the rear of the wireless communication device, and receiving the speaker enhancer includes receiving the speaker enhancer at least partially over the battery compartment.

11. The method of claim 9, wherein the wireless communication device includes one or more holes on the rear and the speaker enhancer includes one or more corresponding protruding catches that mate with the one or more holes, and receiving the speaker enhancer includes receiving the one or more protruding catches in the one or more holes on the rear of the wireless communication device.

12. The method of claim 9, wherein the sealed acoustic enclosure has a volume of 4-8 cubic centimeters.

13. The method of claim 9, wherein the speaker engagement section includes an engagement face, a port communicating with the sealed acoustic enclosure, and a seal surrounding the port on the engagement face, and receiving includes receiving the speaker enhancer so that the port communicates the rearward-facing, rear-mounted speaker with the sealed acoustic enclosure.

14. The method of claim 13, wherein the rear of the wireless communication device includes sound holes for the rearward-facing, rear-mounted speaker, and receiving includes receiving the speaker enhancer so that the seal of the speaker engagement section sealingly engages the rear of the wireless communication device around the sound holes.

15. A speaker enhancer for a wireless communication device, the wireless communication device including a rear, a rearward-facing, rear-mounted speaker mounted therein, and sound leaks located behind the rearward-facing, rear-mounted speaker in the wireless communication device, comprising:
   a battery door cover comprising
      an acoustic chamber forming section that, when the battery door is mounted to the rear of the wireless communication device, the battery door cover forms a sealed acoustic enclosure along the rear of the wireless communication device; and
      a speaker engagement section that, when the battery door cover is mounted to the rear of the wireless communication device, sealingly engages the rear of the wireless communication device and communicates the rearward-facing, rear-mounted speaker with the sealed acoustic enclosure,
   wherein, when the battery door sealingly engages the rear of the wireless communication device, rearwardly directed sound emitted from the rearward-facing, rear-mounted speaker travels through the speaker engagement section to the sealed acoustic enclosure and primary sound from the speaker is emitted through sound leaks located behind the rearward-facing, rear-mounted speaker in the wireless communication device.

* * * * *